United States Patent [19]

Glover et al.

[11] Patent Number: 5,020,892

[45] Date of Patent: Jun. 4, 1991

[54] APERTURE CONTROL FOR TELESCOPIC GUNSIGHT

[75] Inventors: Larry A. Glover, Fort Collins; John P. McCarty, Greeley; Donald J. Burris, deceased, late of Greeley, all of Colo., by Shirley C. Burris, United Bank of Greeley, co-personal representatives

[73] Assignee: Burris Company, Inc., Greeley, Colo.

[21] Appl. No.: 411,676

[22] Filed: Sep. 25, 1989

[51] Int. Cl.⁵ .................. G02B 23/00; F41G 1/38
[52] U.S. Cl. ............................. 350/537; 33/245
[58] Field of Search ........... 350/537, 550, 566, 560, 350/567, 266, 407, 429, 432, 449; 354/195.1; 33/251, 245

[56] References Cited

U.S. PATENT DOCUMENTS

| | | | |
|---|---|---|---|
| 1,425,321 | 8/1922 | Etherington | 33/251 |
| 2,371,744 | 3/1945 | Eagle | 350/266 |
| 3,456,351 | 7/1969 | Gehmann | 33/251 |
| 4,366,625 | 1/1983 | Gehmann | 33/251 |
| 4,403,421 | 9/1983 | Shepher | 350/550 |

Primary Examiner—Bruce Y. Arnold
Assistant Examiner—James Phan
Attorney, Agent, or Firm—Richard W. Hanes

[57] ABSTRACT

The present invention relates to improvements in a power rifle scope of the type having a tubular housing barrel with enlarged end portions and an optical axis defined by an optical system including an objective lens disposed in the enlarged front end thereof, an eyepiece lens system disposed in the enlarged other end thereof and an erector lens system intermediate the said two ends and where the improvement comprises the addition of a variable optical aperture mounted in and carried by a cylindrical guide tube which is secured interiorly of the scope barrel, a helically rotatable setting ring carried by and disposed exteriorly of the barrel and having an inwardly radially directed actuating pin which passes through the barrel and through a circumferential slot in the guide tube and operatively engages the variable aperture device to vary the light passing capacity of the barrel in response to rotation of the setting ring and sealing rings disposed between the setting ring and the barrel, for and aft of the actuating pin.

5 Claims, 6 Drawing Sheets

Fig_4

Fig_5    Fig_6

Fig_7

Fig_8

Fig_18

Fig_19

Fig_17

APERTURE CONTROL FOR TELESCOPIC GUNSIGHT

The present invention relates to telescopic gunsights and more particularly to apparatus for external variable control of an optical aperture in the sight.

BACKGROUND OF THE INVENTION

Variable aperture diaphragms for optical lens systems have been the subject matter of many prior art disclosures and apparatus; however using a variable aperture devise of the prior art in telescopic gunsights has been impractical and overly expensive, especially considering the problem of sealing the externally actuated adjustment mechanism of the unit against escape of the nitrogen gas contained in the scope to prevent fogging of the lenses. The shock forces to which gun scopes are usually subjected also mitigate against use of the prior art adjustable aperture devices in gun scopes.

The prior art concerning optical systems and adjustable apertures is voluminous, but the prior United States patents which are known to applicants and which deal with this type of device in the setting of the present invention are Nos.: 1,353,151; 2,371,744; 3,981,565; ,3,997,906; 4,047,807; and 4,392,723, none of which disclose apparatus which is anticipatory of the present invention.

It is therefore the principal object of the present invention to provide an externally actuated adjustable optical aperture device for use especially in telescopic gunsights.

Another and incidental object of the invention is to provide a device in an optically augmented gunsight which can control the amount of light reaching the eyepiece lenses so that in bright daylight, when the amount of light coming through the objective lens hinders the optical performance of scope, the light may be reduced so that the image of the target is sharper and more clearly defined; and conversely, when, in twilight conditions and maximum light is required to visualize the target, the aperture may be adjusted to admit all of the light passing through the objective lens.

A further object of the invention is to provide a means of increasing the depth of the focus field of a scope and decreasing parallax by elimination of the edge rays of the total bundle of light rays passing through the objective lens system.

Another object of the invention is to provide a simple and inexpensive externally actuated adjustment mechanism which may be sealed so as to retain the nitrogen gas encapsulated within the scope.

A still further object of the invention is to provide a series of different mechanisms for varying the light admitted to the eyepiece lenses, but all with a generically simple external adjustment mechanism.

Other and still further objects, features and advantages of the present invention will become apparent upon a reading of the detailed description of the various embodiments of the invention, taken in conjunction with the accompanying drawings in which:

FIG. 9 is a vertical cross-sectional view taken down the longitudinal centerline of the scope. The adjustable aperture of the FIG. 9 embodiment is one in which a fixed aperture diaphragm is made to slide longitudinally, infringing in its forward-most position on the circumferential edge of the bundle of light rays that constitute the image passing through the objective lens. The edge of the light ray bundle in the forward position of the diaphragm is shown in the darker, interrupted line and the edge of the bundle of light rays when the diaphragm is in its most rearward position is shown in dashed lines.

SUMMARY OF THE INVENTION

Generically, the apparatus of the present invention is housed within the cylindrical portion of a generally tubular gunsight telescope body. That portion of the body is provided with external threads which engage the internal threads of an external circumambient aperture setting ring. The setting ring carries an inwardly protruding actuator pin which passes through a diagonal slot in the tubular body to engage the actuating mechanism of the variable aperture device. Sealing rings are provided on both forward and rearward sides of the actuator pin to seal the space between the scope body and the aperture setting ring so that the nitrogen gas which fills the interior of the scope will not escape through the aperture adjusting mechanism. As the setting ring is rotated on the engaging threads, the actuator pin moves the aperture mechanism to either admit or restrict the admission of light reaching the eyepiece lens system.

Three different embodiments of the variable aperture apparatus are disclosed.

The first embodiment utilizes a plurality of diaphragm rings, each with a number of equally spaced apart radially inwardly projecting leaves which, when placed in stacked coaxial relationship one to another and selectively circumferentially oriented, present a minimal obstruction to light passing through the scope body from the objective lens or a maximum obstruction to the light, leaving only an aperture comprising a circle defined by the arcuately-shaped inner ends of the leaves, or by adjusting some in between variant of the light amount.

The second embodiment utilizes a cup-shaped slide tube aperture which contains at least one fixed opening. As the slide tube aperture is moved longitudinally inside the scope body by rotation of the setting ring's actuator pin the position of the fixed aperture controls the diameter of the conical bundle of light rays that constitute the image passing through the objective lenses to either admit the full cone of light or admit some reduced diameter cone of light, depending on the longitudinal position of the slide tube. The slide tube can, and may preferably, contain more than one fixed aperture, the plurality of apertures being mutually parallel and respectively sized in diameter to admit a cone of light.

The third embodiment of the invention constitutes an iris leaf arrangement which is more typical of variable aperture devices. The circularly arranged overlying semicircular leaves are each rotated about their respective pivot points in the flange of a mounting guide sleeve by a rotatable drive ring which is operatively connected to the setting ring actuator pin to open and close the iris eye of the aperture to achieve the purpose of the invention.

DETAILED DESCRIPTION

Figure 1:
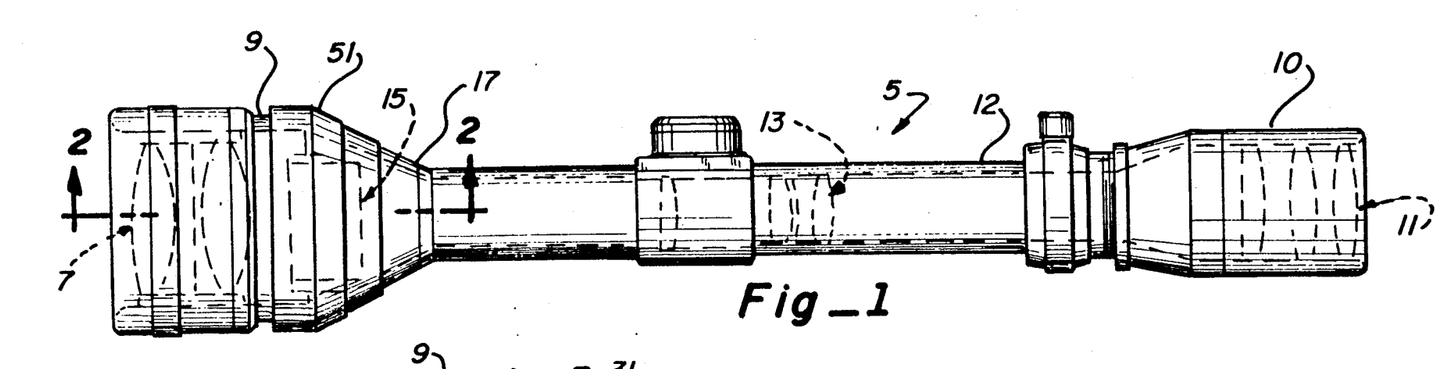
FIG. 1 is a side elevational view of the optical gun sighting telescope of the present invention.

For a detailed description of the present invention, reference is first made to FIG. 1 of the drawings, showing a rifle scope 5 having an objective lens subassembly 7 in a forwardly disposed tubular housing 9 and an eyepiece lens system 11 supported in the enlarged rear portion 10 of the main scope barrel 12. Intermediate the said two lens systems 7 and 11 is an erector lens system, generally referred to by reference numeral 13. An adjustable aperture subassembly 15 is shown generally at its location just behind the objective lens subassembly 7 within the flared bell-shaped rear portion 17 of the tubular housing 9, all of which is an extension of the forward end of the barrel 12. Surrounding the tubular housing 9 is the exteriorly mounted setting ring 51 which is rotatable to vary the adjustable aperture 15.

Figure 8:
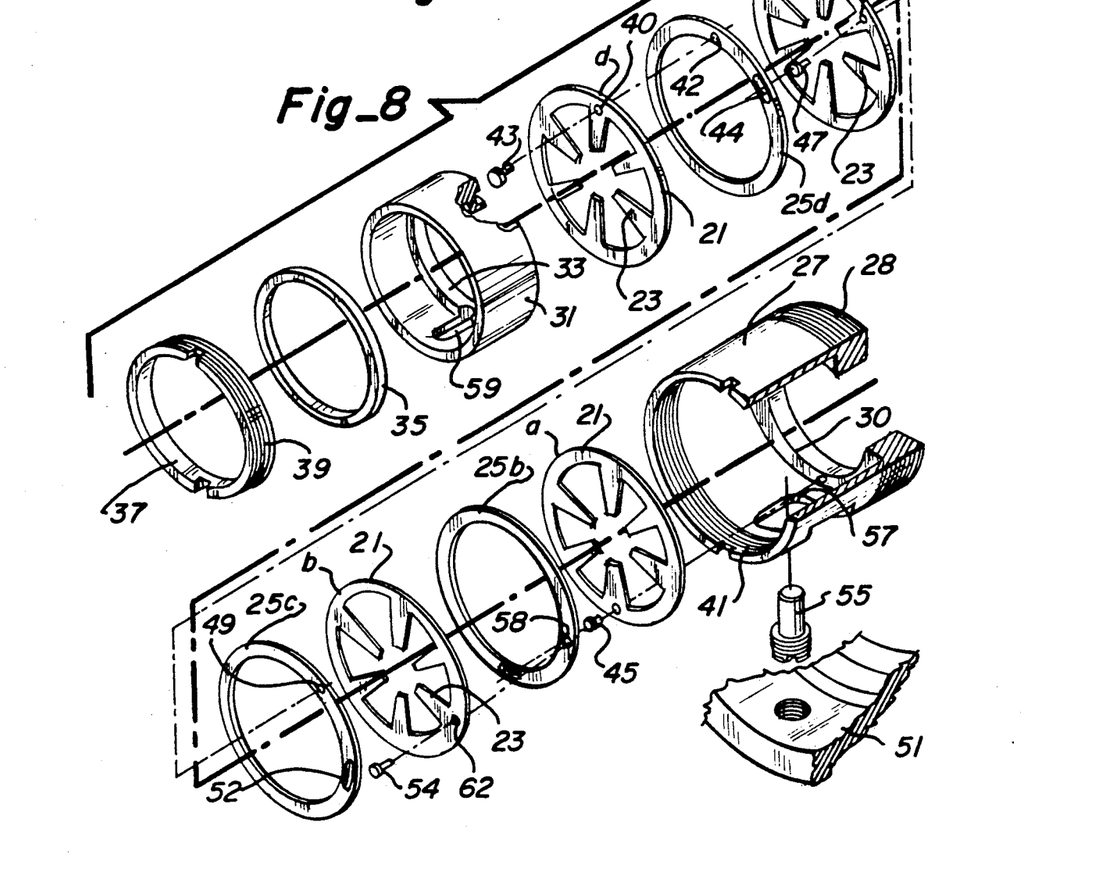
FIG. 8 is an exploded view of the first embodiment of the adjustable lens apparatus which has been shown in FIGS. 2-7.

Within the subassembly 15, a preferred form of diaphragm is comprised of four longitudinally spaced apart rings 21a through 21d (FIG. 8), each having a plurality of inwardly radially projecting leaves 23, the inner arcuate ends of which form the circumference of a tubular aperture. The diaphragm rings 21 are held in spaced apart relation by three spacer rings 25.

Figure 2:
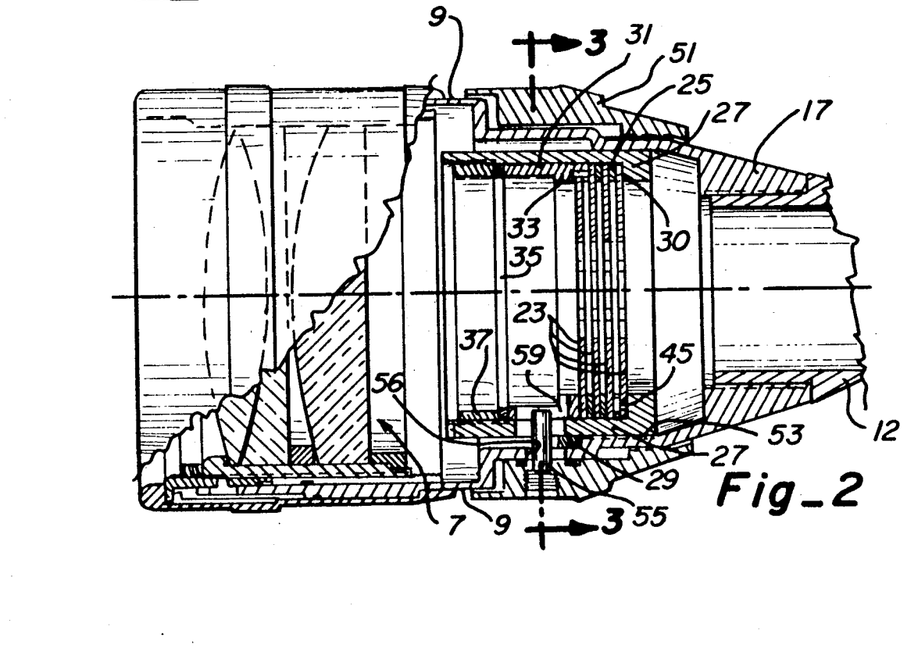
FIG. 2 is an enlarged fragmentary view of the forward portion of the scope with portions thereof broken away and shown in cross section which is taken along lines 2—2 of FIG. 1.
Figure 4:
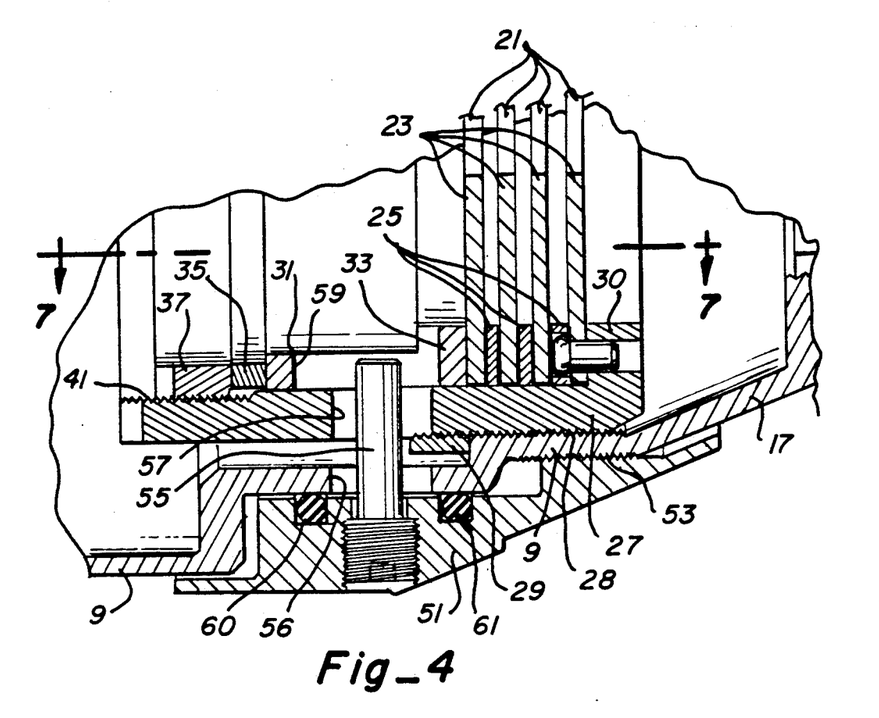
FIG. 4 is an enlarged fragmentary cross-sectional view taken along lines 4—4 of FIG. 3.

The diaphragm rings 21 and their spacer rings 25 are housed in a guide sleeve 27 which is threaded to the inside of the tubular housing 9 with threads 28, as shown in FIG. 4. The guide sleeve 27 is secured in place by a guide sleeve lock ring 29 internally threaded to the outside threads 28 of the guide sleeve 27 and abutted against a circumferential curb formed into the housing 9 (FIGS. 2 and 4). The rearward facing end of the guide sleeve 27 is provided with a reduced diameter annular flange 30 against which the rear face of the most rearward diaphragm ring 21a bears. The assembly of rings 21 and spacers 25 is compacted and held together by a rotatable annular retainer 31 which fits inside the guide sleeve 27, as shown best in FIG. 2. The retainer 31 has a rear radially inwardly directed annular flange 33 which bears against the peripheral forward face of the front-most one of the diaphragm rings 21d. The retainer 31 is secured within the inside of the sleeve 27 by a washer 35 and a ring screw fastener 37 whose outside threads 39 engage the inside threads 41 on the front end of the sleeve 27, as seen best in FIGS. 4 and 8.

Having described the mounting of the diaphragm rings 21 and their integral leaves 23, the construction of the adjustment mechanism will be detailed. In accordance with the novel aspects of the invention, the diaphragm leaves 23 of the respective disks 21 are serially rotated to effect a change in the amount of light reaching the erector lens set 13. The rotation of the disks 21 is implemented by an exteriorly mounted aperture setting ring 51 engaged, with helically disposed threads 53, to the outside circumference of the tubular housing 9. Carried by the setting ring 51 is a radially inwardly projecting actuator pin 55 which is positioned to project through an opening in the housing 9 (not shown in FIG. 8) and through an elongated opening 57 in the sleeve 27 and into a correspondingly positioned elongated aperture 59 in the retainer 31. As the pin 55 is rotated by the turning of the setting ring 51, the retainer 31 is also rotated because of the close fit of the pin within the retainer slot 59.

To accomplish the serial or sequential rotation of the various disks 21 upon rotation of the retainer, several pin and slot interconnections between the retainer 31 and the disks are made. First, a stud 43 is retained in the flange 33 of the retainer 31 and is of sufficient length to extend through a circular aperture 40 in the rim of the first disk 21d and on into a similarly sized circular aperture 42 in the first spacer 25d. The circular apertures 40 and 42 are of such diameter as to closely accommodate the stud 43 so as to cause rotation of the said first disk and the first spacer upon rotation of the retainer 31.

Spaced clockwise forty-five degrees from the aperture 42 on the rim of the spacer 25d is a slot 44 which retains the head of a stud 47 which is of sufficient length to extend through a circular aperture 48 in the rim of the second disk 21c and on into a similar sized circular aperture 49 in the rim of the second spacer 25c. As with the previously described disk and spacer, the apertures 48 and 49 are sized to closely accommodate the stud 47 so as to cause rotation of the said second disk and the second spacer upon rotation of the first spacer 25d more than fifteen degrees. The lengthwise dimension of the slot 44 in the first spacer and the positioning of the stud 47 therein will cause the head of the stud 47 to come into contact with the end of the slot 44 whenever the first spacer 25d has been rotated fifteen degrees.

Spaced clockwise forty-five degrees from the circular aperture 49 on the rim of the second spacer 25c is a slot 52, similar in shape and dimension to the slot 44 in the first spacer 25d, which slot houses the head of a third stud 54. This third stud 54 extends through the circular apertures 62 and 58 in the rims of the disk 21b and the rearwardly adjacent spacer 25b respectively. As in the previous case, rotation of the spacer 25c, which retains the third stud 54, more than fifteen degree will result in the stud 54 becoming engaged with one end of the housing slot 52, resulting in rotation of the third disk 21b and the third spacer 25b.

The fourth disk 21a does not rotate. It is maintained in a fixed position by a stud 45 which fastens the disk 21a to the flange 30 of the guide sleeve 27.

Figure 3:
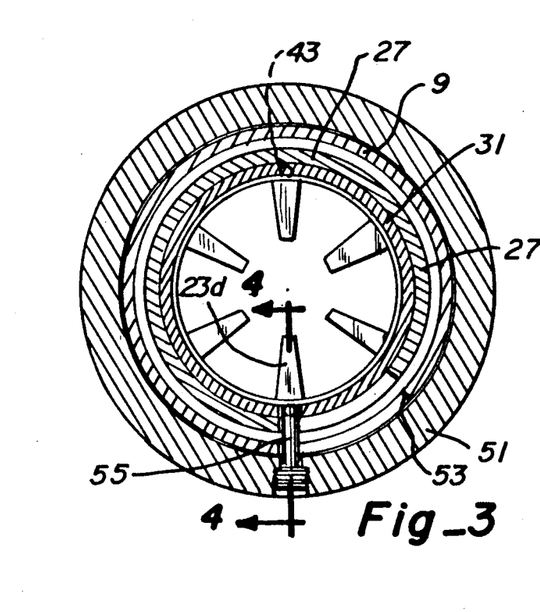
FIG. 3 is a cross-sectional view taken along lines 3—3 of FIG. 1 showing the actuator pin and the adjustable aperture mechanism in the fully open position.
Figure 5:
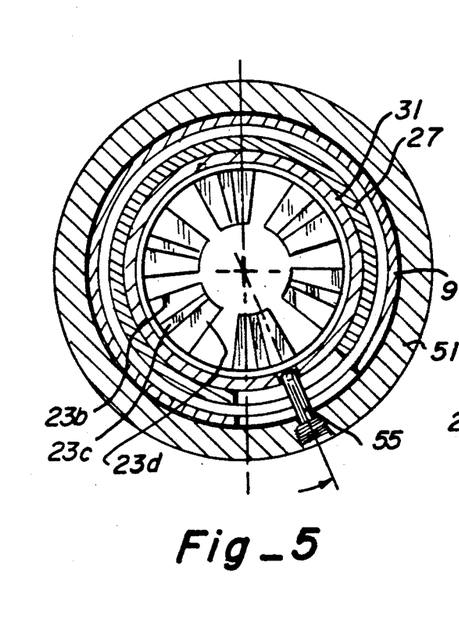
FIG. 5 is a cross-sectional view taken along lines 3—3 of FIG. 2 showing the actuator pin and the adjustable aperture mechanism in the half-open position.
Figure 6:
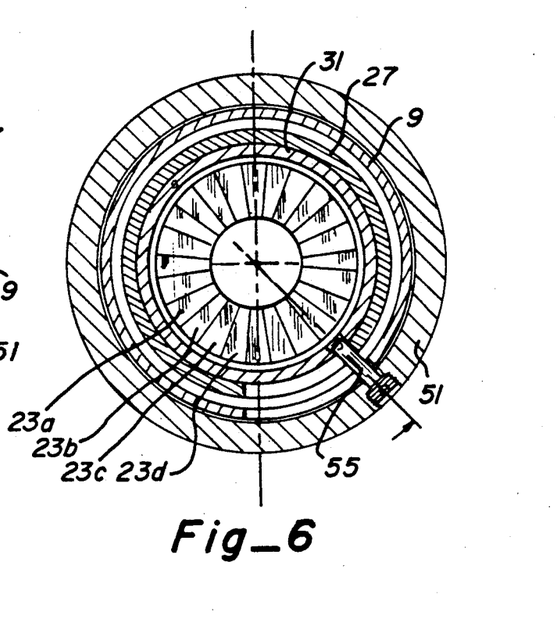
FIG. 6 is a cross-sectional view taken along lines 3—3 of FIG. 2 showing the actuator pin and the adjustable aperture mechanism in the closed position.
Figure 7:
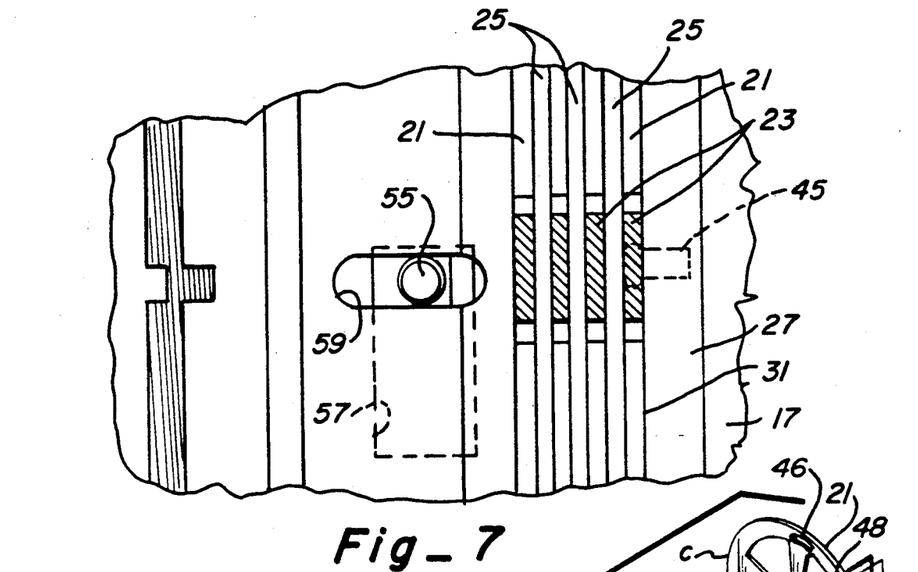
FIG. 7 is a fragmentary cross-sectional view taken along lines 7—7 in FIG. 4.

From an understanding of the stud interconnections of the disks 21 and the spacers 25, it becomes apparent as to how the leaves 23 of the aperture disks 21 are made to take different relative positions to one another, opening the scope barrel, as shown in FIG. 3, or closing areas of the barrel, as shown progressively in FIGS. 5 and 6. By fully rotating the setting ring 51, the actuating pin 55 moves through a possible arc of forty-five degrees. FIG. 3 depicts the actuator pin at the zero degree position where the aperture is fully open because the disks 21 are positioned so that the leaves 23 of the respective disks are superimposed upon each other, that is the total profile of the aperture is the profile of only one disk. As the actuator pin 55 is rotated, for example to the position shown in FIG. 5, the first disk 21d is rotated the same number of degrees as is the pin 55. As the first disk is rotated beyond fifteen degrees, the stud 43 rotates the second disk 21c. As the second disk rotates beyond fifteen degrees the stud 47 brings along the third disk 21b. When the third disk is rotated a full fifteen degrees the leaves of the forth and fixed position disk 21a are fully exposed and the aperture is in its fully closed position, admitting light through the circle defined by the arcs of the ends of each of the leaves 23 of all the disks 21.

The aperture is opened by reversing the process when the driving studs 43, 47 and 45 move in the opposite direction, driven by the reverse rotation of the retainer 31 in response to movement of the actuator pin 55.

The second embodiment of the apparatus of the present invention is shown in FIGS. 9 through 12. The variable aperture is formed by a longitudinally movable substantially cup-shaped slide tube 70 having two mutually parallel fixed apertures containing faces 74 and 76. The slide tube 70 is slidably mounted inside of the guide sleeve 80 and is oriented therein by a tube screw 83 which is carried in a screw hole 87 in the guide sleeve. The tube screw 83 is threaded into a cylindrical plug 86 which is disposed in a longitudinal slot 88 in the slide tube 70 in order to accommodate the longitudinal movement of the slide tube with the guide sleeve as a result of the rotation of the actuating pin 55. The actuating pin 55, which is carried by the setting ring 51, as in the first embodiment, protrudes through a slot 56 in the scope body, also as in the first embodiment, and through a circumferential slot 85 in the guide sleeve 80, terminating in the arcuate slot 89 in the perimetrical wall of the slide tube 70. As the pin 55 is rotated by the setting ring 51, it exerts a longitudinal force on the slide tube 70 by virtue of its interaction with the arcuate slot 89, which moves the slide tube within the guide sleeve 80. The guide sleeve 80 is fixed in position within the scope body 9 by being screwed into place by the interaction of the sleeve's external threads 91 and the corresponding internal threads 92 in the scope body 9.

Figure 9:
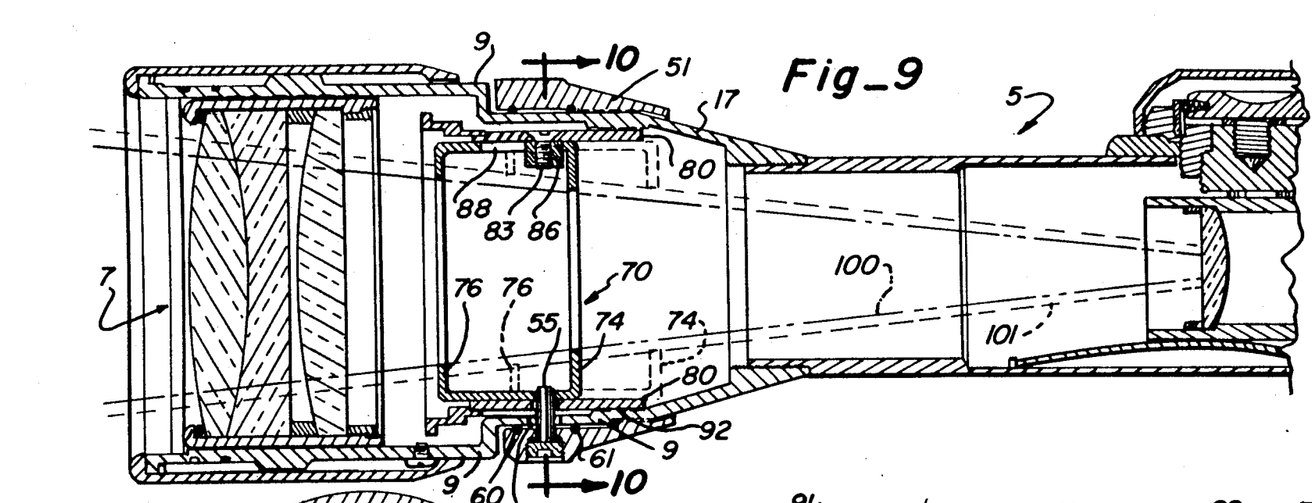
FIG. 9 is an enlarged fragmentary view of the scope of the present invention showing a second embodiment of the adjustable aperture mechanism.
Figure 10:
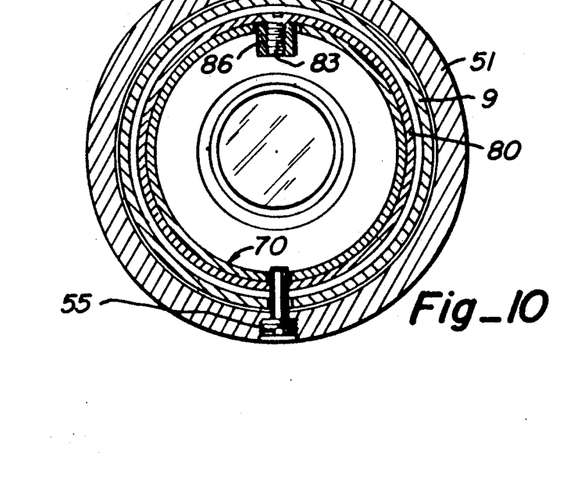
FIG. 10 is a cross-sectional view of the second embodiment of this invention taken along lines 10—10 of FIG. 9.
Figure 11:
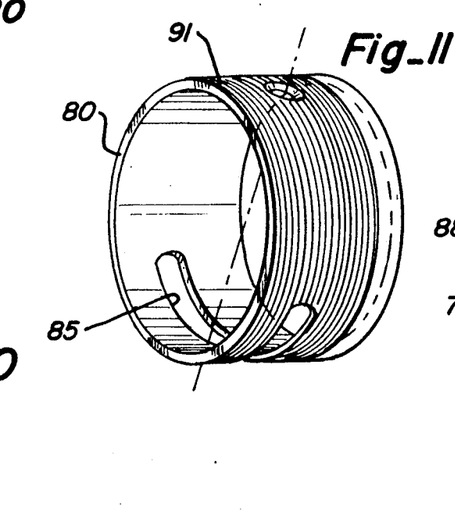
FIG. 11 is a perspective view of the guide sleeve which surrounds the slide tube aperture of the second embodiment.
Figure 12:
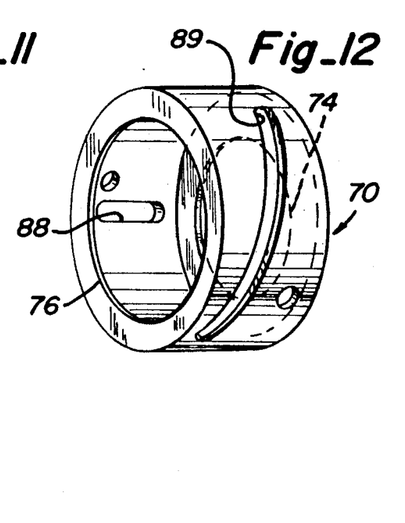
FIG. 12 is a perspective view of the slide tube aperture.
Figure 13:
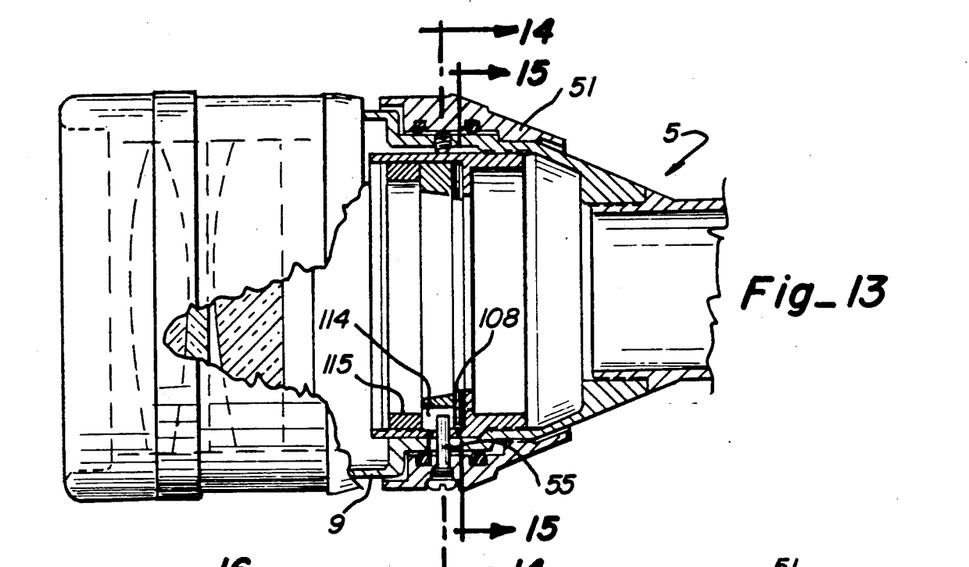
FIG. 13 is an enlarged fragmentary view of the forward part of the scope of the present invention with portions broken away and shown in vertical cross section to reveal the third embodiment of the invention.
Figure 14:
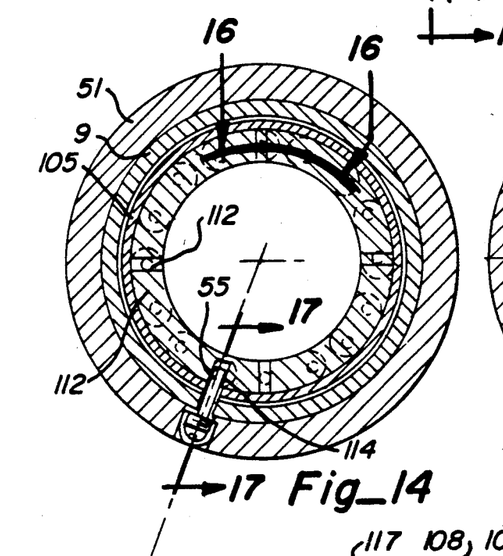
FIG. 14 is a cross-sectional view taken along lines 14—14 of FIG. 13 with the aperture shown in open position.
Figure 15:
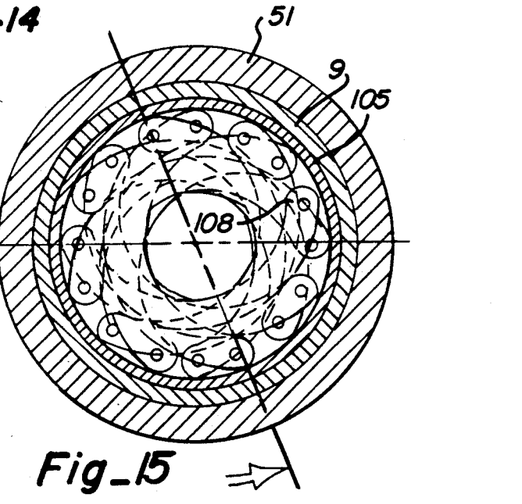
FIG. 15 is a cross-sectional view taken along lines 15—15 of FIG. 13 with the aperture shown in closed position.
Figure 16:
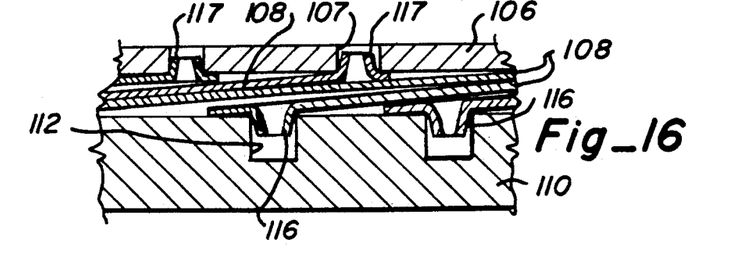
FIG. 16 is an enlarged fragmentary cross-sectional view taken along lines 16—16 of FIG. 14.
Figure 17:
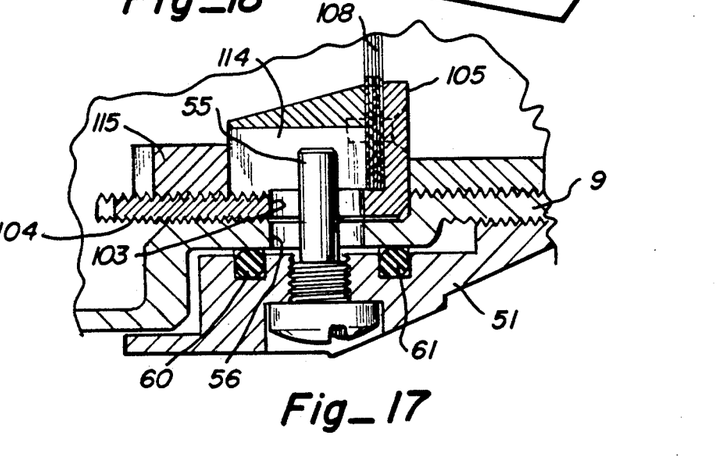
FIG. 17 is an enlarged fragmentary cross-sectional view taken along lines 17—17 of FIG. 14.

It is seen that as the slide tube 70 is moved longitudinally in the scope barrel the conical bundle of light rays passing through the objective lens set 7 is altered in its diameter by the two parallel fixed apertures 74 and 76 of the slide tube 70. FIG. 9 shows, in solid lines, the forward position of the slide tube where the edge 100 of the conical bundle of light rays is shown by the heavy interrupted line. This position represents the daylight or bright light setting where the amount of light admitted to the erector lens 13 is preferably reduced to enhance the image being viewed. The dotted line position 101 of the slide tube 70 in FIG. 9 shows a position where more light is admitted, that is, the conical bundle of light rays is able to have a greater diameter because of the rearward longitudinal position of the fixed apertures 74 and 76.

A third embodiment of the invention is shown in FIGS. 13 through 19 using an iris arrangement.

Figure 18:
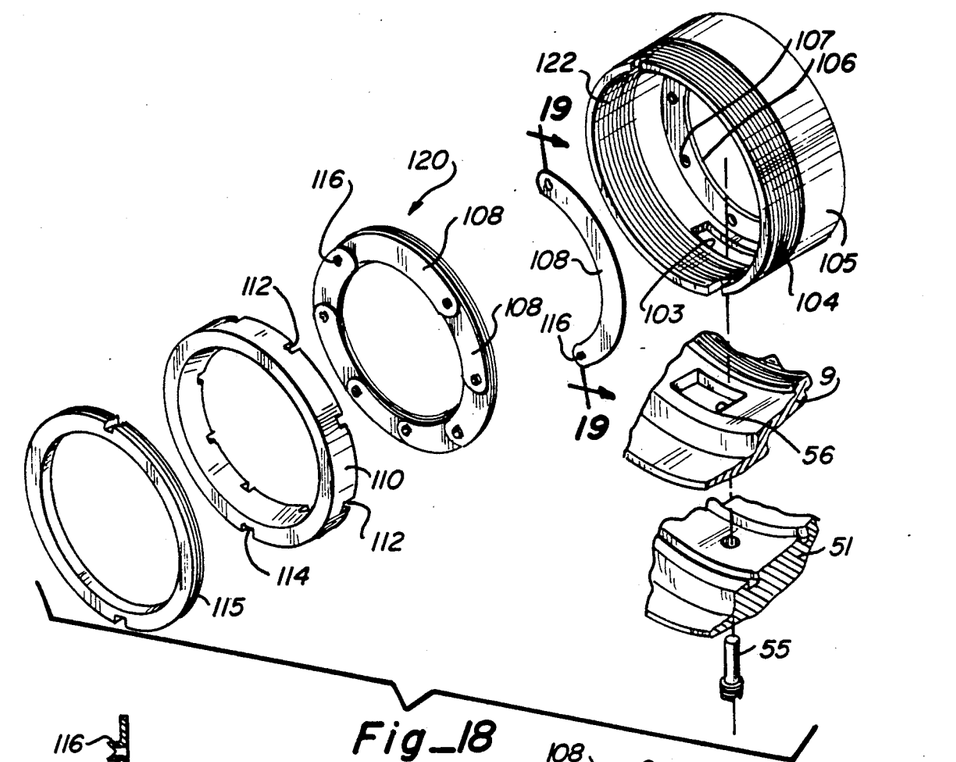
FIG. 18 is an exploded view of the variable aperture apparatus of the third embodiment of the invention with portions of the operating mechanism shown fragmentarily and in cross section.
Figure 19:
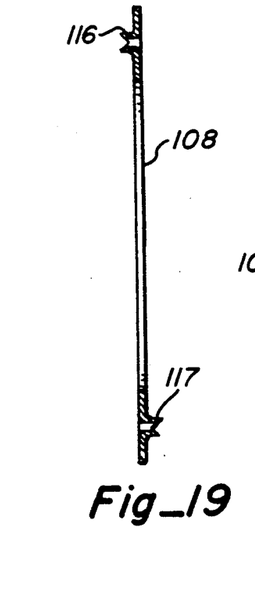
FIG. 19 is a cross-sectional view of a typical aperture iris leaf, taken along lines 19—19 of FIG. 18.

The exploded view of FIG. 18 is the most instructive with respect to the assembly of this embodiment of the variable aperture. A cylindrical guide sleeve 105 is attached to the inside of the scope barrel by means of exterior mounting threads 104. The sleeve 105 has an inwardly directed flange 106 at its rearward end in which are located a plurality of small apertures 107 which are sized and dimensioned to receive a protruding hinge pin 117 formed as an integral part of each of the iris leaves 108. Pivotal connections are thus established with the hinge pins 117 of the leaves and the apertures 107.

As seen from FIG. 18, the individual semi-circular iris leaves 108 are overlaid, one on another, to form a circular subassembly 120 with the hinge pins 117 of one side of each leaf being seated in the pin receiving apertures 107 in the flange 106 of the guide sleeve 105.

The subassembly 120, after being positioned as described in the guide sleeve 105, is operated by a cylindrical drive ring 110. The ring has a number of radial notches 112 or slots in its rearward face to receive the protruding hinge pins 116 of the frontally exposed leaves 108. As the ring is rotated, by engagement between its circumferential slot 114 and the actuator pin 55, which comes through the circumferential slot 103 in the guide sleeve 105, the hinge pins 116 which engage the slots 112 move up or down within the slots, rotating each of the respective iris leaves about their points of rotation 107, opening or closing the iris in a well known fashion.

The drive ring 110 is kept in place within the guide sleeve by a retainer ring 115 which is screwed into the interior threads 122 on the interior circumference of the guide sleeve 105.

As with the other embodiments of the invention, "O"-ring seals 60 and 61 are provided between the tubular housing or barrel 9 and the setting ring 51 to establish a gas tight seal around the movable actuator pin 55.

We claim:

1. In a rifle scope having a tubular housing barrel with enlarged end portions, and optical axis defined by an optical system including objective lens means disposed in the enlarged front end thereof, eyepiece lens means disposed in the enlarged other end thereof and erector lens means intermediate the said two ends and an optical aperture along said optical axis, the improvement which comprises;
- variable optical aperture forming means for varying the size of said optical aperture,
- cylindrical guide means secured interiorly of the barrel and carrying the variable optical aperture forming means and having a circumferentially extending slot,
- a rotatable setting ring carried by and disposed exteriorly of the barrel and having an inwardly radially directed actuating pin which passes through the barrel and through the circumferential slot of the guide means and operatively engages the variable optical aperture forming means to vary the light passing capacity of the barrel in response to rotation of the setting ring,
- sealing means disposed between the setting ring and the barrel for and aft of the actuating pin.

2. In a rifle scope having a tubular housing barrel with enlarged end portions, an optical axis defined by an optical system including objective lens means disposed in the enlarged front end thereof, eyepiece lens means disposed in the enlarged other end thereof and erector lens means intermediate the said two ends and an optical aperture along said optical axis, the improvement which comprises;
- variable optical aperture forming means for varying the size of said optical aperture,
- cylindrical guide means secured interiorly of the barrel and carrying the variable optical aperture forming means and having a circumferentially extending slot.
- a rotatable setting ring carried by and disposed exteriorly of the barrel and having an inwardly radially directed actuating pin which passes through the barrel and through the circumferential slot of the guide means and operatively engages the variable optical aperture forming means to vary the light passing capacity of the barrel in response to rotation of the setting ring,
- sealing means disposed between the setting ring and the barrel for and aft of the actuating pin.
- wherein the variable optical aperture forming means includes;
- a plurality of disks coaxially mounted in file within the guide means, each having,
  - an annulus having a plurality of spaced apart inwardly radially projecting leaves whose individual lengths are less than the radius of the circle forming the inner annular circumference,
- tubular retainer means rotatably disposed within the guide means coaxially of the guide means and the disks and in file with the disks and carrying means for operatively engaging the actuating pin,
- means fixing at least one of the disks to the guide means so as to be nonrotatable.
- pin and slot means operatively interconnecting the tubular retainer means and the rotatable disks in order that as the retainer means is rotated by the actuator pin, the disks which are so interconnected are sequentially rotated to selected angular positions.

3. In a rifle scope having a tubular housing barrel with enlarged end portions, an optical axis defined by an optical system including objective lens means disposed in the enlarged front end thereof, eyepiece lens means disposed in the enlarged other end thereof and erector lens means intermediate the said two ends and an optical aperture along said optical axis, the improvement which comprises:
- variable optical aperture forming means for varying the size of said optical aperture,
- cylindrical guide means secured interiorly of the barrel and carrying the variable optical aperture forming means and having a circumferentially extending slot,
- a rotatable setting ring carried by and disposed exteriorly of the barrel and having an inwardly radially directed actuating pin which passes through the barrel and through the circumferential slot of the guide means and operatively engages the variable optical aperture forming means to vary the light passing capacity of the barrel in response to rotation of the setting ring,
- sealing means disposed between the setting ring and the barrel for and aft of the actuating pin,
- wherein the variable optical aperture forming means includes;
- a tubular fixed aperture member coaxially mounted in the guide means and disposed for longitudinal movement along the optical axis; and
- helical slot means in the circumferential wall of the fixed aperture member which operatively engages the actuator pin.

4. In a rifle scope having a tubular housing barrel with enlarged end portions, an optical axis defined by an optical system including objective lens means disposed int he enlarged front end thereof, eyepiece lens means disposed in the enlarged other end thereof and erector lens means intermediate the said two ends and an optical aperture along said optical axis, the improvement which comprises;
- variable optical aperture forming means for varying the size of said optical aperture,
- cylindrical guide means secured interiorly of the barrel and carrying the variable optical aperture forming means and having a circumferentially extending slot,
- a rotatable setting ring carried by and disposed exteriorly of the barrel and having an inwardly radially directed actuating in which passes through the barrel and through the circumferential slot of the guide means and operatively engages the variable optical aperture forming means to vary the light passing capacity of the barrel in response to rotation of the setting ring,
- sealing means disposed between the setting ring and the barrel for and aft of the actuating pin,
- wherein the variable optical aperture forming means includes;
- a plurality of stacked substantially semi-circular iris leaves each having rearwardly and forwardly protruding hinge pins on each end thereof, forming a circular subassembly of iris leaves, said subassembly being coaxially mounted in the guide means,
- an inwardly projecting flange on the rearward end of the guide means having a plurality of hinge pin receiving apertures, said plurality equaling the number of iris leaves, and where the rearwardly projecting hinge pins of the subassembly are seated in the said receiving apertures,
- an annular iris drive ring coaxially disposed within the guide means in juxtaposition with the said subassembly and including, a circumferential slot to operatively engage the actuator pin, a plurality of radially extending slots on the side of the annular ring which faces the subassembly and receiving the forwardly protruding hinge pins of the subassembly, and locking means engaged with the guide means and abutting the drive ring.

5. The combination of claim 3 amended where the fixed aperture member includes a first inwardly directed flange at its forward end and a second inwardly directed flange at its rearward end where the circle defined by the inner circumference of the second flange has a smaller diameter than the circle defined by the inner circumference of the first flange.

* * * * *